United States Patent
Bower et al.

(10) Patent No.: US 11,230,294 B2
(45) Date of Patent: Jan. 25, 2022

(54) VEHICLE SPEED ESTIMATION SYSTEM

(71) Applicant: TOYOTA MOTOR ENGINEERING & MANUFACTURING NORTH AMERICA, INC., Plano, TX (US)

(72) Inventors: Laura E. Bower, Whitmore Lake, MI (US); Rebecca L. Kemph, Ann Arbor, MI (US)

(73) Assignee: TOYOTA MOTOR ENGINEERING & MANUFACTURING NORTH AMERICA, INC., Plano, CA (US)

( * ) Notice: Subject to any disclaimer, the term of this patent is extended or adjusted under 35 U.S.C. 154(b) by 133 days.

(21) Appl. No.: 16/824,424

(22) Filed: Mar. 19, 2020

(65) Prior Publication Data
US 2021/0291844 A1 Sep. 23, 2021

(51) Int. Cl.
*B60W 40/105* (2012.01)

(52) U.S. Cl.
CPC ..... *B60W 40/105* (2013.01); *B60W 2520/105* (2013.01); *B60W 2520/28* (2013.01); *B60W 2540/10* (2013.01); *B60W 2540/12* (2013.01); *B60W 2552/15* (2020.02)

(58) Field of Classification Search
CPC .................................................. B60W 40/105
See application file for complete search history.

(56) References Cited

U.S. PATENT DOCUMENTS

| | | |
|---|---|---|
| 5,577,816 A | 11/1996 | Suzuki et al. |
| 6,334,500 B1 | 1/2002 | Shin |
| 6,466,855 B2 * | 10/2002 | Yamaguchi ............. B60T 8/172 180/197 |
| 9,849,873 B2 | 12/2017 | Yang et al. |
| 2006/0089771 A1* | 4/2006 | Messih ............... B60R 21/0132 701/45 |
| 2010/0198441 A1* | 8/2010 | Mizuno .................. B62D 17/00 701/22 |
| 2012/0029783 A1* | 2/2012 | Takenaka ................ B60T 8/172 701/73 |
| 2013/0144476 A1* | 6/2013 | Pinto ................... B60T 8/17555 701/22 |
| 2013/0253731 A1* | 9/2013 | Kanou ...................... B60T 7/12 701/1 |
| 2014/0145498 A1* | 5/2014 | Yamakado ............ B60W 30/02 303/3 |
| 2015/0232093 A1* | 8/2015 | Fairgrieve ............... B60T 8/175 701/90 |

(Continued)

FOREIGN PATENT DOCUMENTS

| | | |
|---|---|---|
| CN | 107719372 A | 2/2018 |
| CN | 110562263 A | 12/2019 |

*Primary Examiner* — Jonathan M Dager
(74) *Attorney, Agent, or Firm* — Haynes and Boone, LLP (57) ABSTRACT

Disclosed is a system for estimating the speed of a vehicle. The system includes a plurality of wheel rotation sensors, a grade sensor, an acceleration sensor, an accelerator pedal deflection sensor, a brake pedal deflection sensor, and a processor. The processor is configured to compute a linear wheel speed, an upper limit of vehicle speed, and a lower limit of vehicle speed, based on the grade information, the pedal deflection information, and the acceleration, and then compute an estimated speed of the vehicle based on the linear wheel speed, the upper limit of vehicle speed, and the lower limit of vehicle speed.

19 Claims, 6 Drawing Sheets

(56) References Cited

U.S. PATENT DOCUMENTS

| | | | |
|---|---|---|---|
| 2016/0082974 A1* | 3/2016 | Jeong | G01C 9/08 |
| | | | 702/154 |
| 2016/0185337 A1* | 6/2016 | Morita | B60W 50/0097 |
| | | | 701/22 |
| 2016/0379389 A1* | 12/2016 | Fukada | G06T 11/206 |
| | | | 345/589 |
| 2017/0267280 A1* | 9/2017 | Mahabadi | B60W 40/00 |
| 2018/0105065 A1* | 4/2018 | Ide | H02P 6/04 |
| 2019/0256099 A1* | 8/2019 | Mizuguchi | B60W 40/105 |
| 2019/0344796 A1* | 11/2019 | Lian | B60L 15/20 |
| 2019/0381895 A1* | 12/2019 | Shindo | B60T 7/12 |

* cited by examiner

VEHICLE SPEED ESTIMATION SYSTEM

TECHNICAL FIELD

The subject matter described herein relates to devices and methods for estimating the speed of a vehicle. This technology has particular but not exclusive utility for cars and trucks.

BACKGROUND

Motor vehicles track their speed in real time by measuring wheel rotation, based on the presumption that each rotation of the wheel carries the vehicle forward by a distance equal to the circumference of the wheel. Wheel rotation is typically measured with wheel encoders that produce an output signal indicative of the rotation speed of the wheel. When a vehicle is turning, all four wheels may be following different arcs and/or slipping by different amounts, and therefore rotating at different speeds, which can lead to inaccuracy in the speed estimate. Also, during a loss of traction event, wheel rotation may not be a reliable indicator of vehicle speed. Thus, when the wheels have lost traction and are slipping, rotation rate of the wheels may result in an inaccurate vehicle speed estimate. An inaccurate vehicle speed estimate can lead to improper motor control of individual wheels, and a motor over-speed condition, where one or more wheels turn too fast. This can be hazardous for control of the vehicle if, for example, the wheel suddenly regains traction, leading to unpredictable vehicle dynamics, including high torque on the vehicle that can result in a spinout or other loss of control. This condition may also be harmful to vehicle hardware, as sudden changes in wheel speed may create large torques or other forces on mechanical components.

The inaccuracy of such traditional speed estimation schemes during loss of traction may be particularly pronounced for vehicles with independent control over more than two wheels, such as four-wheel drive vehicles, all-wheel drive vehicles, and hybrid or all-electric vehicles with independent drive motors for each wheel. Accordingly, a need exists for vehicle speed estimation systems that provide better speed estimates during a loss of traction.

The information included in this Background section of the specification, including any references cited herein and any description or discussion thereof, is included for technical reference purposes only and is not to be regarded as limiting.

SUMMARY

Disclosed is a vehicle speed estimation system that provides a more accurate estimated vehicle speed by considering additional variables that affect vehicle speed. The proposed system improves speed estimation by considering individual wheel speeds, previous vehicle speed, accelerator and brake pedal inputs, estimated road grade, and accelerometer data. This improved speed estimation provides for improved vehicle stability and control under a broader range of conditions, including loss of traction. The vehicle speed estimation system disclosed herein has particular, but not exclusive, utility for cars and trucks.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for estimating a speed of a vehicle. The system includes a plurality of wheel rotation sensors, each configured to provide rotation speed information of a corresponding wheel of the vehicle. The system also includes a grade sensor configured to provide grade information of a ground surface beneath the vehicle, and an acceleration sensor configured to provide acceleration information of the vehicle. The system also includes a first pedal deflection sensor configured to provide a first pedal deflection information of an accelerator pedal of the vehicle, and a second pedal deflection sensor configured to provide a second pedal deflection information of a brake pedal of the vehicle. The system also includes a processor configured to: compute a linear wheel speed based on the rotation speed information of the wheels of the vehicle; compute an upper limit of vehicle speed and a lower limit of vehicle speed, based on the grade information, the first pedal deflection information, the second pedal deflection information, and the acceleration information; and compute an estimated speed of the vehicle based on the linear wheel speed, the upper limit of vehicle speed, and the lower limit of vehicle speed. Other embodiments of this aspect include corresponding computer systems, apparatus, and computer programs recorded on one or more computer storage devices, each configured to perform the actions of the methods.

Implementations may include one or more of the following features. The system where each of the plurality of wheel rotation sensors includes a wheel encoder. The system where computing the linear wheel speed involves: selecting a second-smallest wheel rotation speed of the rotation speed information of the wheels of the vehicle; and converting the second-smallest wheel rotation speed to a linear speed based on a circumference of a wheel of the vehicle corresponding to the second-smallest wheel rotation speed. The system where the grade sensor includes the acceleration sensor. The system where the grade sensor includes a positioning sensor and a geographic database. The system where computing the upper limit of vehicle speed and the lower limit of vehicle speed includes: selecting the first pedal deflection as a pedal input if the first pedal deflection is nonzero, and otherwise selecting the second pedal deflection as the pedal input; computing an expected speed change based on the pedal input and the grade information; computing a preliminary speed change estimate by adding the expected speed change weighted by a first weight to the acceleration information of the vehicle weighted by a second weight; computing the upper limit of vehicle speed based on the preliminary speed change estimate and an upper tolerance; and computing the lower limit of vehicle speed based on the preliminary speed change estimate and a lower tolerance. The system where computing the estimated speed of the vehicle includes selecting a second-largest value from the group including: the lower limit of vehicle speed, the linear wheel speed, and the upper limit of vehicle speed. The system where the processor is configured to calculate the estimated speed of the vehicle continuously in a cycle time of between 2 milliseconds and 10 milliseconds. The system further including the vehicle. Implementations of the described techniques may include hardware, a method or process, or computer software on a computer-accessible medium.

One general aspect includes a method for estimating a speed of a vehicle. The method includes measuring rotation speeds of at least one wheel of the vehicle. The method also includes, based on the rotation speeds of the at least one wheel of the vehicle, computing a linear wheel speed. The method also includes obtaining grade information for a ground surface beneath the vehicle, measuring a first pedal deflection of an accelerator pedal of the vehicle, measuring a second pedal deflection of a brake pedal of the vehicle, and measuring an acceleration of the vehicle. The method also includes, based on the grade information, the first pedal deflection, the second pedal deflection, and the acceleration of the vehicle, computing an upper limit of vehicle speed and a lower limit of vehicle speed. The method also includes selecting a speed estimate based on a second-largest value from the group including: the linear wheel speed, the upper limit of vehicle speed, and the lower limit of vehicle speed. Other embodiments of this aspect include corresponding computer systems, apparatus, and computer programs recorded on one or more computer storage devices, each configured to perform the actions of the methods.

Implementations may include one or more of the following features. The method where computing the linear wheel speed involves: selecting a second-smallest wheel rotation speed of the rotation speeds of the at least one wheel of the vehicle; and converting the second-smallest wheel rotation speed to a linear speed based on a circumference of a wheel of the vehicle corresponding to the second-smallest rotation speed. The method where obtaining the grade information includes reading at least one value from an acceleration sensor. The method where obtaining the grade information involves reading values from a positioning sensor and a geographic database. The method where computing the upper limit of vehicle speed and the lower limit of vehicle speed includes: selecting the first pedal deflection as a pedal input if the first pedal deflection is nonzero, and otherwise selecting the second pedal deflection as the pedal input; computing an expected speed change based on the pedal input and the grade information; computing a preliminary speed change estimate by adding the expected speed change weighted by a first weight to the vehicle acceleration weighted by a second weight; computing the upper limit of vehicle speed based on the preliminary speed change estimate and an upper tolerance; and computing the lower limit of vehicle speed based on the preliminary speed change estimate and a lower tolerance. Implementations of the described techniques may include hardware, a method or process, or computer software on a computer-accessible medium.

One general aspect includes a method for estimating a speed of a vehicle. The method includes measuring rotation speeds of at least one wheel of the vehicle. The method also includes, based on the rotation speeds of the at least one wheel of the vehicle, computing a change in a linear wheel speed over a defined period of time. The method also includes obtaining grade information for a ground surface beneath the vehicle, measuring a first pedal deflection of an accelerator pedal of the vehicle, measuring a second pedal deflection of a brake pedal of the vehicle, and measuring an acceleration of the vehicle. The method also includes, based on the grade information, the first pedal deflection, the second pedal deflection, and the acceleration of the vehicle, computing an upper limit of a change in vehicle speed over the defined period of time and a lower limit of the change in vehicle speed over the defined period of time. The method also includes selecting a speed estimate equal to a previous speed of the vehicle plus a second-largest value from among the group including: the change in the linear wheel speed over the defined period of time, the upper limit of the change in vehicle speed over the defined period of time, and the lower limit of the change in vehicle speed over the defined period of time. Other embodiments of this aspect include corresponding computer systems, apparatus, and computer programs recorded on one or more computer storage devices, each configured to perform the actions of the methods.

Implementations may include one or more of the following features. The method where computing the linear wheel speed involves: selecting a second-smallest wheel rotation speed of the rotation speeds of the at least one wheel of the vehicle; and converting the second-smallest wheel rotation speed to a linear speed based on a circumference of a wheel of the vehicle corresponding to the second-smallest rotation speed. The method where obtaining the grade information includes reading at least one value from an acceleration sensor. The method where obtaining the grade information involves reading values from a positioning sensor and a geographic database. The method where computing the upper limit of the change in vehicle speed and the lower limit of the change in vehicle speed includes: selecting the first pedal deflection as a pedal input if the first pedal deflection is nonzero, and otherwise selecting the second pedal deflection as the pedal input; computing an expected speed change based on the pedal input and the grade information; computing a preliminary speed change estimate by adding the expected speed change weighted by a first weight to the vehicle acceleration weighted by a second weight; computing the upper limit of vehicle speed change based on the preliminary speed change estimate and an upper tolerance; and computing the lower limit of vehicle speed change based on the preliminary speed change estimate and a lower tolerance. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the vehicle speed estimation system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

In accordance with at least one embodiment of the present disclosure, a vehicle speed estimation system is provided that provides a more accurate estimated vehicle speed by considering additional mechanical, dynamic, environmental, and software variables that can affect vehicle speed. The proposed system improves speed estimation by considering, in real time, individual current wheel speeds, previous measured or estimated vehicle speed, current accelerator and brake pedal inputs, a current estimated road grade, and current accelerometer readings. This improved speed estimation provides for improved vehicle stability and control under a broader range of conditions, including partial or total loss of traction for one or more wheels due to snow, ice, hydroplaning, rapid acceleration, rapid deceleration, or rapid cornering of the vehicle. Depending on the implementation, other variables may be included instead of or in addition to those described herein.

The present disclosure aids substantially in the stability and control of the vehicle, by improving real-time estimates of vehicle speed when at least one wheel is slipping. Implemented on one or more processors within the vehicle, the vehicle speed estimation system disclosed herein provides practical, real-time calculation of vehicle speeds based on multiple variables, weighted in real time according to current conditions. This improved speed estimation transforms a vehicle control loop based on second-lowest wheel speed alone, to one based on a more detailed understanding of the current status of the vehicle, without the normally routine need to rely on operator inputs to compensate for wheel slip. This unconventional approach improves the functioning of the vehicle, by enabling more accurate real-time control over power and braking to individual wheels during a wheel-slip incident.

The vehicle speed estimation system may be implemented as a combination of hardware and/or software modules, and operated by a control process executing on a processor circuit that accepts user inputs from the vehicle operator, and that is in communication with motors and/or brakes associated with individual wheels of the vehicle. In that regard, the control process performs certain specific operations in response to different inputs made at different times, by the driver operating the steering wheel, brake, and accelerator. Certain structures, functions, and operations of the processor circuit, sensors, and user input systems are known in the art, while others are recited herein to enable novel features or aspects of the present disclosure with particularity.

These descriptions are provided for exemplary purposes only, and should not be considered to limit the scope of the vehicle speed estimation system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Figure 1:
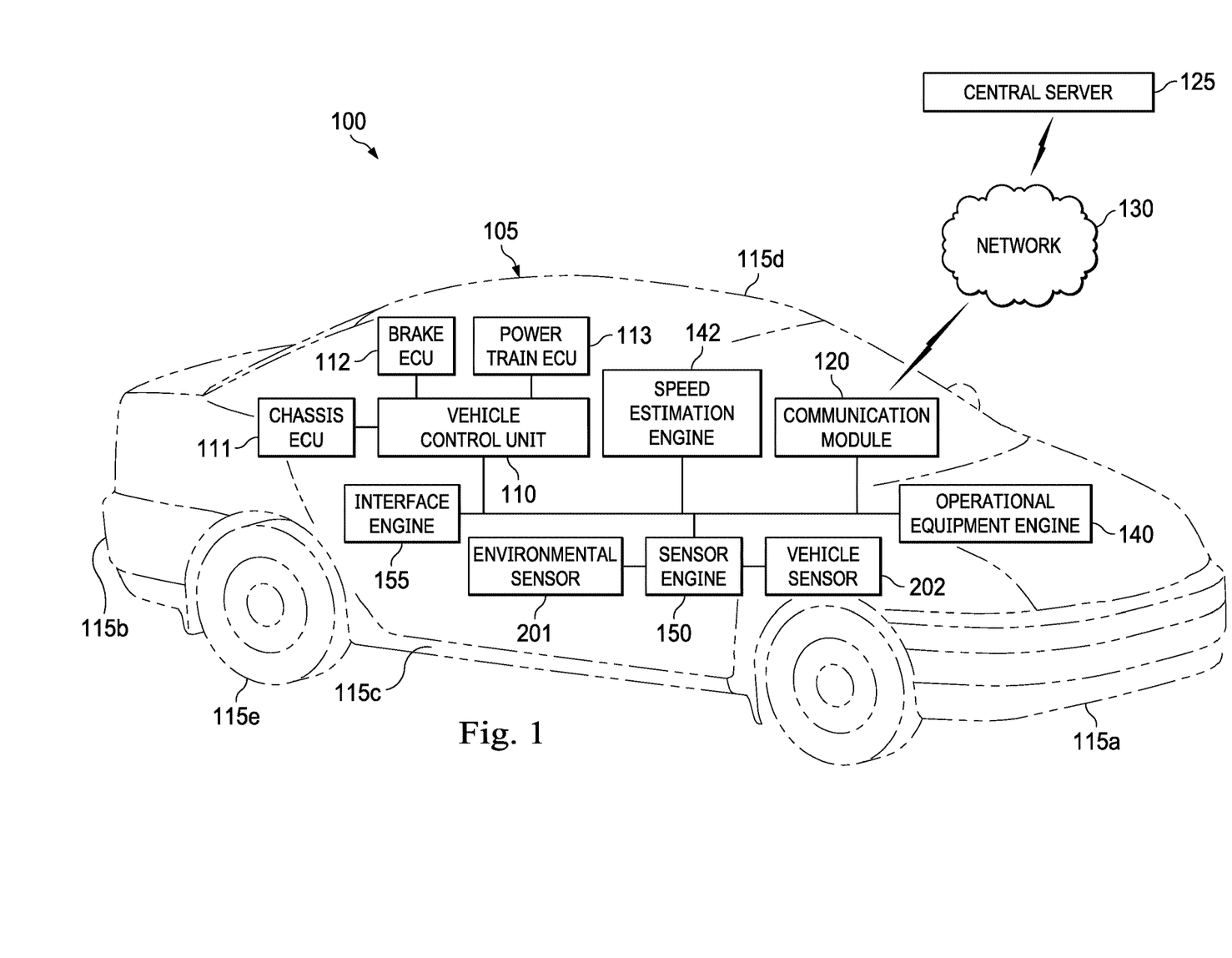
FIG. 1 is a diagrammatic illustration, in a block diagram form, of a vehicle speed estimation system in accordance with at least one embodiment of the present disclosure.

FIG. 1 is a diagrammatic illustration, in a block diagram form, of a vehicle speed estimation system in accordance with at least one embodiment of the present disclosure. In an example, a vehicle speed estimation system is referred to by the reference numeral 100 and includes a vehicle 105, such as an automobile, and a vehicle control unit (VCU) 110 located on the vehicle 105. The vehicle 105 may include a front portion 115*a* (including a front bumper), a rear portion 115*b* (including a rear bumper), a right side portion 115*c* (including a right front quarter panel, a right front door, a right rear door, and a right rear quarter panel), a left side portion 115*d* (including a left front quarter panel, a left front door, a left rear door, and a left rear quarter panel), and wheels 115*e*. A communication module 120 may be operably coupled to, and adapted to be in communication with, the vehicle control unit 110. The communication module 120 may be adapted to communicate wirelessly with a central server 125 via a network 130 (e.g., a 3G network, a 4G network, a 5G network, a Wi-Fi network, or the like, including communicating via a combination of one or more or networks). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the vehicle speed estimation system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain. The system also includes one or more environmental sensors 201, one or more vehicle sensors 202, and a vehicle speed estimation engine 142, the operation of which will be described below.

It is understood that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
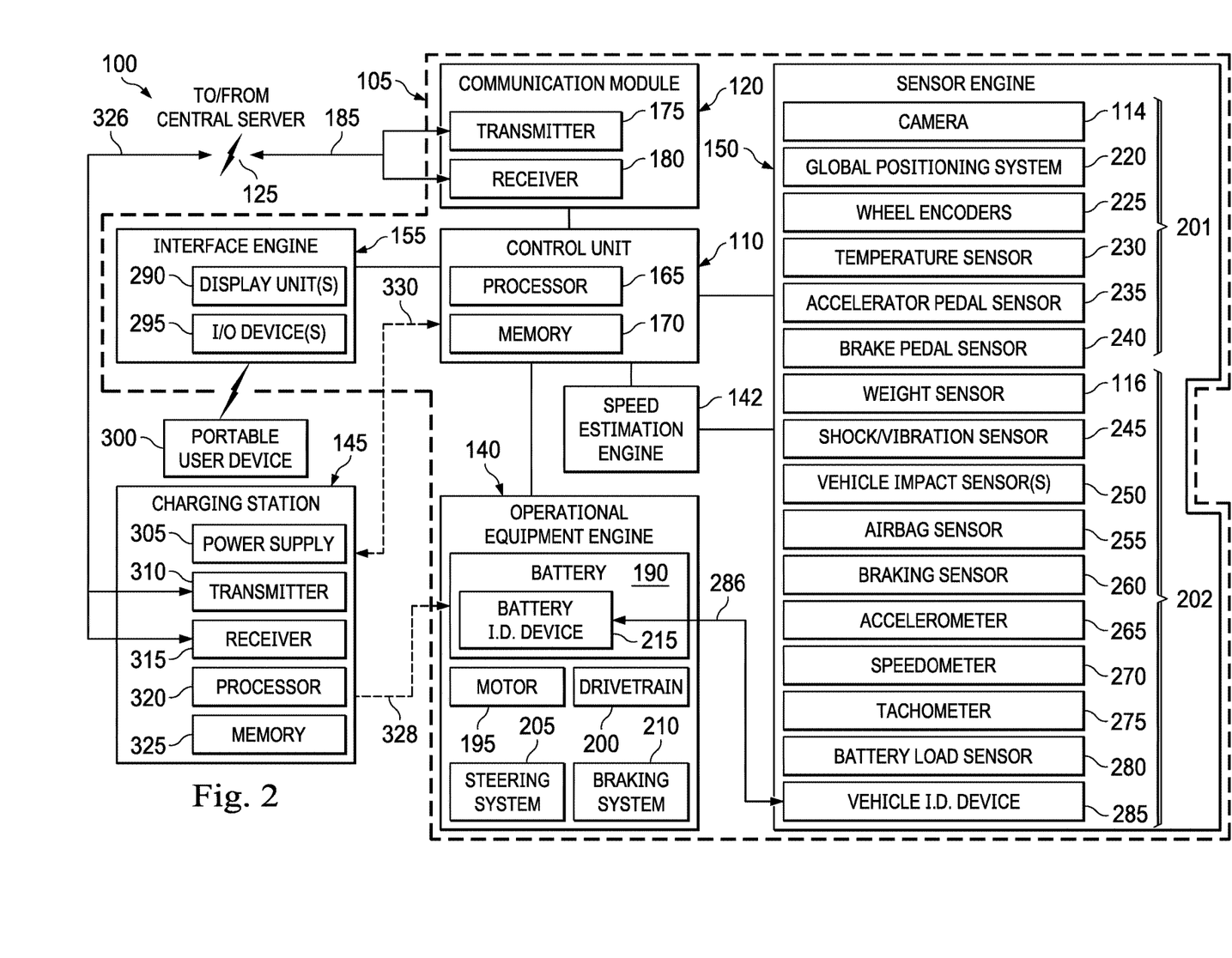
FIG. 2 is a diagrammatic illustration, in a block-diagram form, of at least a portion of the vehicle speed estimation system of FIG. 1, in accordance with at least one embodiment of the present disclosure.

FIG. 2 is a diagrammatic illustration, in a block-diagram form, of at least a portion of the vehicle speed estimation system 100 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain or transmission 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system (GPS) or other positioning sensor 220 (e.g., GLONASS, Galileo, LORAN, WiFi triangulation, radio broadcast tower triangulation, or cell tower triangulation system, etc.), wheel encoders 225, accelerator pedal deflection sensors 235, brake pedal deflection sensors 240, a shock/vibration sensor 245, a vehicle impact sensor 250, an airbag sensor 255, a braking sensor 260, an accelerometer or acceleration sensor 265, a speedometer 270, a tachometer 275, a battery load sensor 280, a vehicle identification device 285, a 2D or 3D camera 114, a weight sensor 116, or any combinations thereof. The sensors or other detection devices may be configured to sense or detect activity, conditions, and circumstances in an area to which the device has access, e.g., conditions inside or outside the vehicle cabin. Sub-components of the sensor engine 150 may be deployed at any operational area where information on the driving of the vehicle 105 may occur. Readings from the sensor engine 150 are fed back to the vehicle control unit 110, brake ECU 112, power train ECU or hybrid ECU 113, and/or speed estimation engine 142. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110 or brake ECU 112. The accelerometer 265 is adapted to monitor acceleration of the vehicle 105 and to communicate the acceleration information to the vehicle control unit 110, hybrid ECU/power train ECU 113, or speed estimation engine 142. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated. In other examples, the portable device is, or can serve as, an electronic key fob.

Also visible is a vehicle charging or refueling station 145, which supplies fuel or energy 328 to the operational equipment engine 140, and may include such components as a power supply 305, transmitter 310, receiver 315, processor 320, and memory 325.

The vehicle speed estimation system 100 also includes a speed estimation engine 142, the operation of which will be described below. In some embodiments, the speed estimation engine 142 comprises a standalone housing with its own processor and memory. In other embodiments, the speed estimation engine 142 exists as software, firmware, or hardware within another processor, such as the vehicle control unit 110, operational equipment engine 140, brake ECU 112, or power train ECU/hybrid ECU 113. The sensor engine 150 includes environmental sensors 201 and vehicle sensors 202.

It is understood that other components or arrangements of components may be found in a vehicle 105, and that the same general principles apply to electric vehicles, internal combustion vehicles, and hybrid vehicles.

Figure 3:
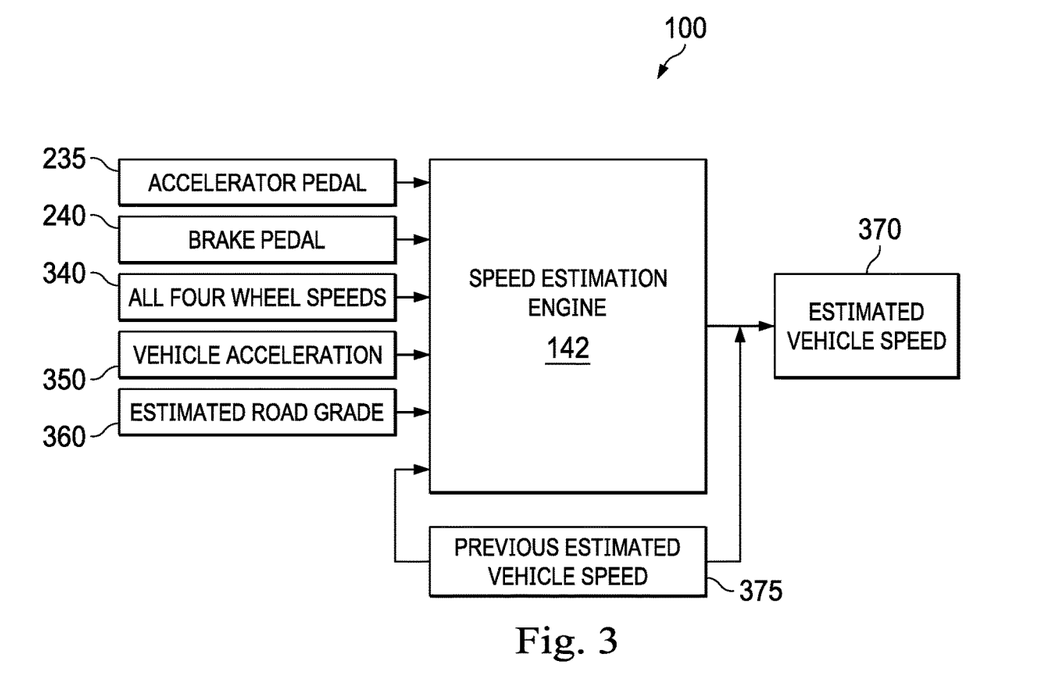
FIG. 3 is a diagrammatic illustration, in a block-diagram form, of at least a portion of an example vehicle speed estimation system in accordance with at least one embodiment of the present disclosure.

FIG. 3 is a diagrammatic illustration, in a block-diagram form, of at least a portion of an example vehicle speed estimation system 100 in accordance with at least one embodiment of the present disclosure. In an example, speed estimation engine 142 calculates an estimated vehicle speed 370, by taking into account wheel speeds 340 for each wheel 115e of the vehicle, a sensed accelerator pedal position 235, a sensed brake pedal position 240, a sensed, calculated, or derived vehicle acceleration 350, an estimated road grade 360, and at least one previous value 375 of the estimated vehicle speed 370. Devices, systems, and method for determining the wheel speeds 340, accelerator pedal position 235, brake pedal position 240, vehicle acceleration 350, and road grade 360 are described below.

Figure 4:
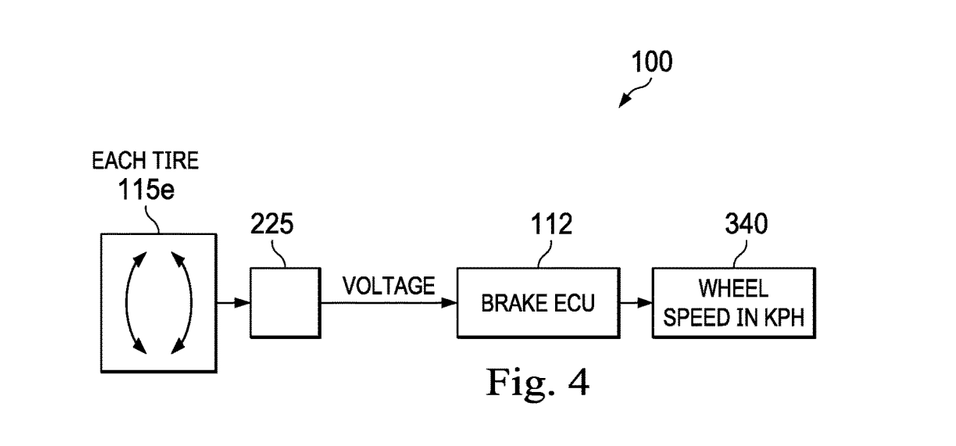
FIG. 4 is a diagrammatic illustration, in a block-diagram form, of at least a portion of an example vehicle speed estimation system in accordance with at least one embodiment of the present disclosure.

FIG. 4 is a diagrammatic illustration, in a block-diagram form, of at least a portion of an example vehicle speed estimation system 100 in accordance with at least one embodiment of the present disclosure. In an example, each wheel or tire 115e is coupled to an individual wheel encoder 225 that converts the wheel rotation (e.g., in RPM, RPS, encoder counts per second, etc.) into a suitable format (e.g., an analog voltage, digital voltage, encoded numerical value, etc.) to be read by the brake ECU 112. The brake ECU 112 then produces a wheel speed 340 in kilometers per hour (KPH) that can be read by other engines, modules, subroutines, or control units within the vehicle. In an example, the wheel speed in KPH presumes that each rotation of the wheel moves the wheel forward by a distance equal to the circumference of the wheel or tire. In some embodiments, an adjustment factor for tire inflation may be applied, such that the wheel speed 340 may be higher or lower if the tire of that wheel is believed to be overinflated or underinflated.

Figure 5:
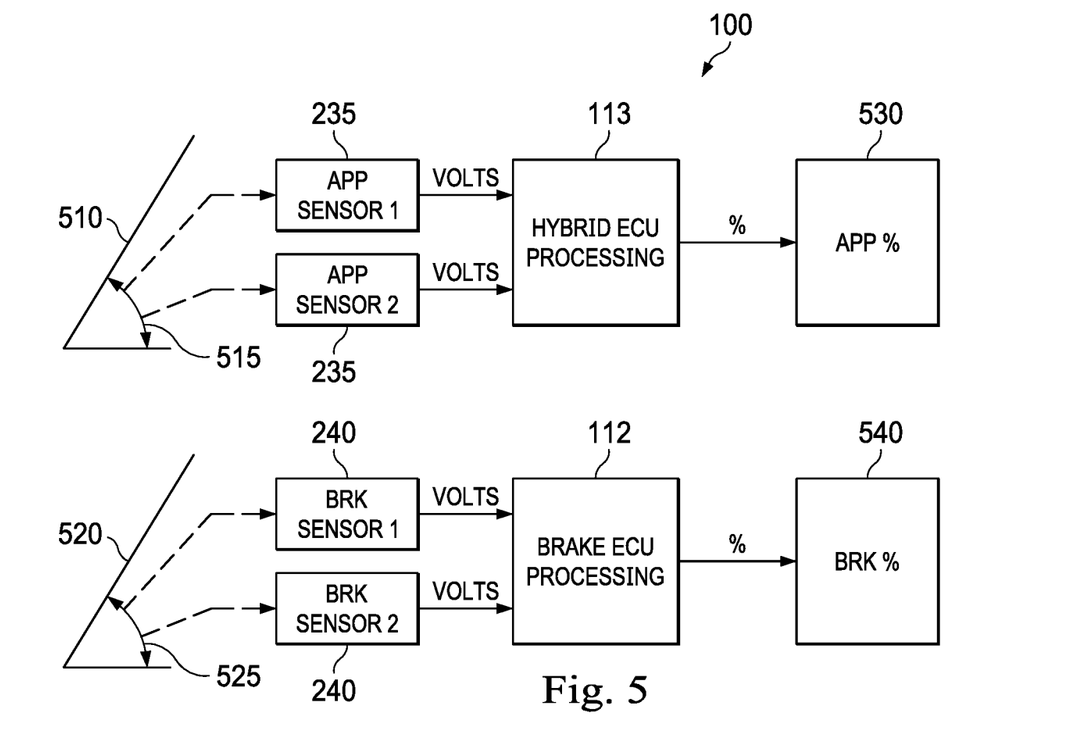
FIG. 5 is a diagrammatic illustration, in a block-diagram form, of at least a portion of an example vehicle speed estimation system in accordance with at least one embodiment of the present disclosure.

FIG. 5 is a diagrammatic illustration, in a block-diagram form, of at least a portion of an example vehicle speed estimation system 100 in accordance with at least one embodiment of the present disclosure. In an example, an accelerator pedal 510 is deflected by an angle 515, which is read by one or more accelerator pedal position sensors 235, which output a representation of the deflection angle 515 of the accelerator pedal 510 in a format (e.g., analog voltage, digital voltage, encoded numerical value, etc.) that can be read or otherwise interpreted by the drive train ECU or hybrid ECU 113 of the vehicle. The drive train ECU or hybrid ECU 113 then outputs an accelerator pedal deflection percentage (e.g., 0% for no pedal deflection or 100% for maximum pedal deflection all the way to the pedal stops) in a format (e.g., analog voltage, digital voltage, encoded numerical value, etc.) that can be read by other engines, modules, subroutines, or control units within the vehicle.

In an example, a brake pedal 520 is deflected by an angle 525, which is read by one or more brake pedal position sensors 235, which output a representation of the deflection angle 525 of the brake pedal 520 in a format (e.g., analog voltage, digital voltage, encoded numerical value, etc.) that can be read or otherwise interpreted by the brake ECU 112 of the vehicle. The brake ECU 112 then outputs a brake pedal deflection percentage (e.g., 0% for no pedal deflection or 100% for maximum pedal deflection all the way to the pedal stops) in a format (e.g., analog voltage, digital voltage, encoded numerical value, etc.) that can be read by other engines, modules, subroutines, or control units within the vehicle.

Figure 6:
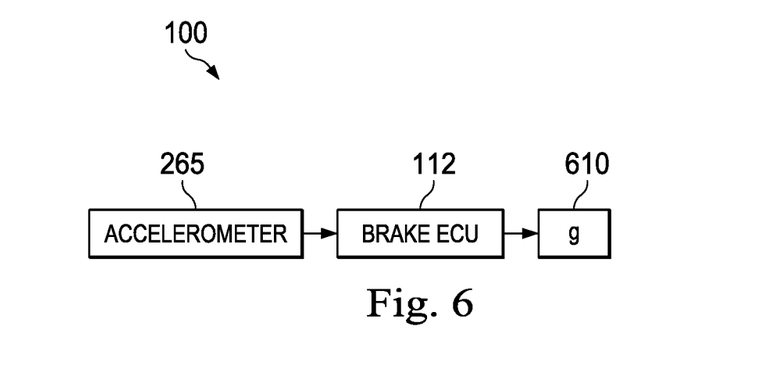
FIG. 6 is a diagrammatic illustration, in a block-diagram form, of at least a portion of an example vehicle speed estimation system in accordance with at least one embodiment of the present disclosure.

FIG. 6 is a diagrammatic illustration, in a block-diagram form, of at least a portion of an example vehicle speed estimation system 100 in accordance with at least one embodiment of the present disclosure. In an example, a brake ECU 112 receives sensor input from an accelerometer 265, which may be a one-axis, two-axis, or three-axis accelerometer. In some embodiments, the acceleration values along two or three orthogonal axes may be converted a vector sum in two-dimensional or three-dimensional space, and a downward acceleration force due to gravity may be subtracted from the vector sum. In other embodiments, downward acceleration (e.g., acceleration along a Z-axis relative to the vehicle) is not measured, or is ignored in the vector sum. In the example shown in FIG. 6, the brake ECU 112 outputs a scalar value, which is the vehicle acceleration 610 in "g" or "gravities" (e.g., 1.0 g is equal to 1.0 times a reference acceleration due to gravity at the surface of the Earth at sea level). In an example, this vehicle acceleration 610 can be communicated to, read by, and/or used by other engines, modules, subroutines, or control units within the vehicle 105.

Figure 7:
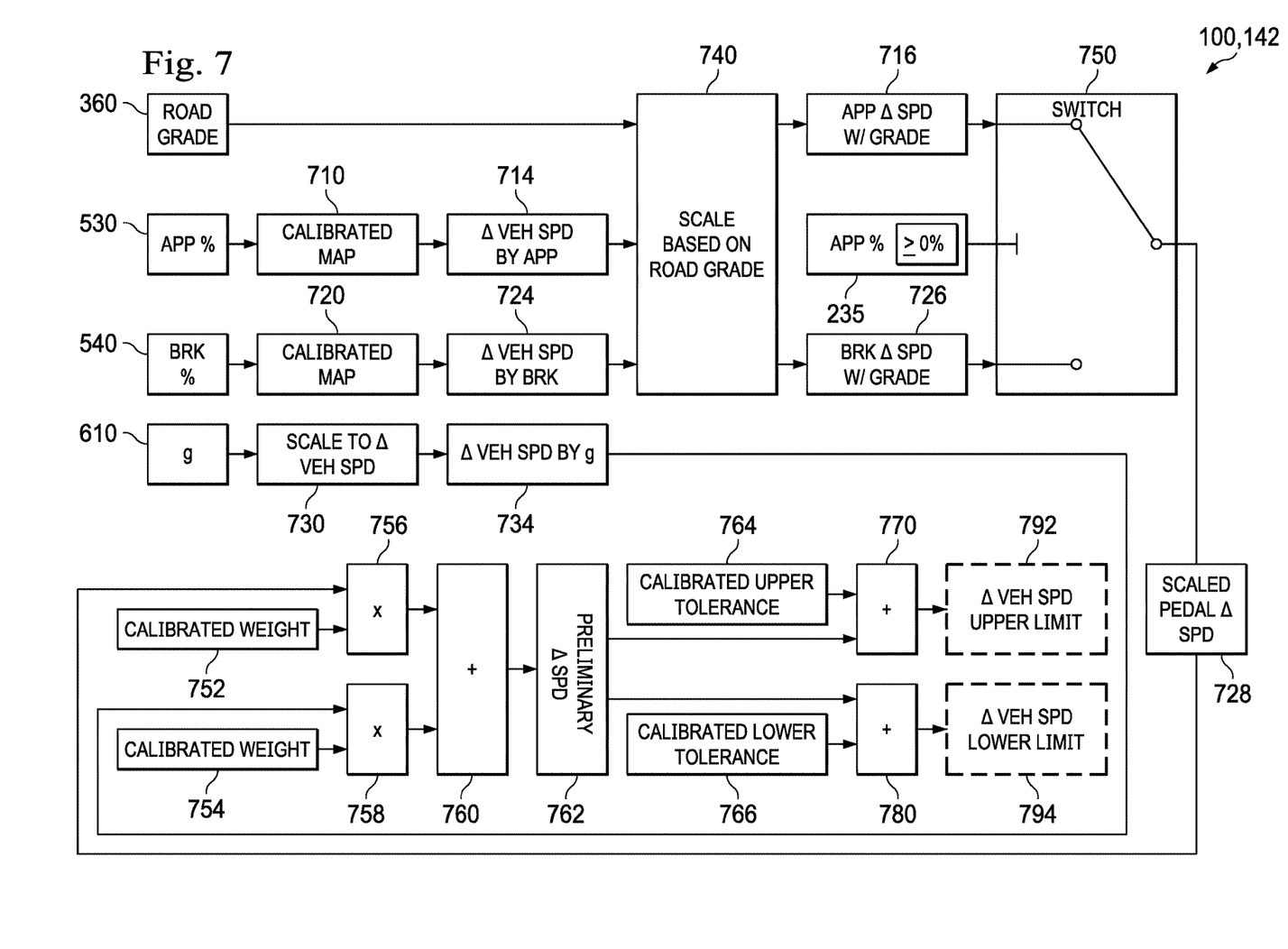
FIG. 7 is a diagrammatic illustration, in a block-diagram form, of at least a portion of an example vehicle speed estimation system in accordance with at least one embodiment of the present disclosure.

FIG. 7 is a diagrammatic illustration, in a block-diagram form, of at least a portion of an example vehicle speed estimation system 100 in accordance with at least one embodiment of the present disclosure. In the example shown in FIG. 7, a speed estimation engine 142 performs a series of logical and arithmetic operations on four variables: an estimated road grade 360, an accelerator pedal position or percentage 235, a brake pedal position or percentage 240, and a vehicle acceleration 350.

In some embodiments, road grade information, including the road grade 360 for the ground surface at the vehicle's current geographic location, may be supplied by a global positioning system or other position sensor (e.g., global positioning system 220 as shown for example in FIG. 2), combined with an onboard geographic database or with external geographic data available from an external server 125. In other embodiments, the road grade 360 may be estimated based on sensor values received from an accelerometer (e.g., accelerometer 265 as shown for example in FIG. 2). This estimation may be performed for example by the brake ECU 112, power train ECU or hybrid ECU 113, vehicle control unit 110, or speed estimation engine 142. The acceleration pedal position 530 may for example be calculated or reported by the power train ECU or hybrid ECU 113 as shown for example in FIG. 5. The brake pedal position 540 may for example be calculated or reported by the brake ECU 112 as shown in FIG. 5.

In an example, the accelerator pedal position 530 is compared against a calibrated acceleration map 710 to produce a predicted change or predicted delta 714 in vehicle speed based on the accelerator pedal position 530, over the most recent computation cycle of the speed estimation engine 142 (e.g., over the past 2 milliseconds, over the past 10 milliseconds, etc.). For example, if the accelerator pedal position 530 is at 0% deflection, the predicted velocity delta 714 may be zero kilometers per hour, whereas if the accelerator pedal is at 100% deflection, then the predicted velocity delta 714 may be positive 0.1 KPH. Depending on the implementation, other values may be used instead or in addition.

In an example, the brake pedal position 540 is compared against a calibrated deceleration map 720 to produce a predicted change or predicted delta 724 in vehicle speed based on the brake pedal position 540, over the most recent computation cycle of the speed estimation engine 142 (e.g., over the past 2 milliseconds, over the past 10 milliseconds, etc.). For example, if the brake pedal position 540 is at 0% deflection, the predicted velocity delta 724 may be zero kilometers per hour, whereas if the accelerator pedal is at 100% deflection, then the predicted velocity delta 724 may be negative 0.2 KPH. Depending on the implementation, other values may be used instead or in addition.

In an example, the sensed vehicle acceleration 610 is compared against a calibrated acceleration-vs.-speed map 730 to produce a predicted change or predicted delta 724 in vehicle speed based on the sensed acceleration 610, over the most recent computation cycle of the speed estimation engine 142. For example, if the measured acceleration 610 is 0.25 g and the current estimated speed of the vehicle is 5 KPH, then the estimated change or delta 734 in vehicle speed based on measured acceleration may be 0.09 KPH, whereas if the measured acceleration 610 is 0.25 g and the current estimated speed of the vehicle is 190 KPH, then the estimated change or delta 734 in vehicle speed based on measured acceleration may be only 0.01 KPH, because the vehicle is already traveling at close to its maximum rated speed, and further speed increases may require more power than the motor or motors 195 can provide. Depending on the implementation, other values may be used instead or in addition.

In some embodiments, calibrated maps 710, 720, and 730 may be vehicle-specific and fixedly defined by the manufacturer at the time of manufacture. In other examples, the maps 710, 720, and 730 may be dynamically adjustable based on performance data from the sensor engine 150, based on different operating modes of the vehicle, or based on software or firmware updates.

In an example, a scaling calculation 740 is performed on the delta speed 714 based on accelerator pedal position and the delta speed 724 based on brake pedal position, using the estimated road grade 360 as an input. For example, the predicted delta velocity 714 based on the accelerator pedal position 530 may be reduced, and the predicted delta velocity 724 based on brake pedal position may be increased, proportional to the road grade, when the vehicle 105 is traveling uphill. Conversely, predicted delta velocity 714 may be increased, and predicted delta velocity 724 may be decreased, proportional to the road grade, if the vehicle 105 is traveling downhill. The scaling calculation 740 outputs a scaled or expected accelerator pedal speed change 716 and a scaled or expected brake pedal speed change 726.

In an example, a switching operation 750 selects between scaled delta speed 716 and scaled delta speed 726 based on the accelerator pedal position 235. For example, if the accelerator pedal position 235 is greater than 0% deflection, then the scaled accelerator pedal delta speed 716 is selected, and the scaled brake pedal speed 726 is deselected. If the accelerator pedal position is equal to 0%, then the scaled accelerator pedal delta speed 716 is deselected, and the scaled brake pedal speed 726 is selected. In other embodiments, the switching operation uses the brake pedal position 540 as an input, and selects scaled delta speed 726, while de-selecting scaled delta speed 716, if the brake pedal position 540 is greater than 0% deflection, but de-selects scaled delta speed 726, while selecting scaled delta speed 716, if the brake pedal position 540 is equal to 0% deflection. A weighted combination of these two switching operations may also be employed. The output of switching operation 750 is a scaled delta speed value 728 based on pedal inputs.

In an example, a multiplication operation 756 multiplies the scaled delta speed value 728 by a calibrated weight 752, and a multiplication operation 758 multiplies the scaled delta speed 734 by a calibrated weight 754, and these two results are then added together in an addition operation 760, to yield a preliminary delta speed value 762. In an example, weighted values 752 and 754 are fractional values between 0.0 and 1.0, and the sum of values 752 and 754 is equal to 1.0, although other weighting schemes may be used instead or in addition. Weights 752 and 754 may be vehicle-specific values fixedly selected by the manufacturer at the time of manufacture, or may be dynamically adjustable based on vehicle performance metrics, software or firmware updates, a Kalman filtering process, etc. In one example, weights 752 and 754 may both be equal to 0.5, reflecting a steady-state condition where both inputs are believed to be reliable and indicative of true vehicle acceleration or deceleration. In another example, weight 754 may be 0.9 and weight 752 may be 0.1, reflecting a condition where at least one wheel 115e of the vehicle 105 is believed to be slipping, and therefore the measured acceleration 610 is believed to be a better predictor of changes in vehicle speed than the pedal inputs 530 and 540. In still another example, weight 752 may be 0.9 and weight 754 may be 0.1, reflecting a condition of high vibration (e.g., vehicle traveling over a washboard surface), such that the accelerometer data is believed to be noisy, and therefore the pedal inputs 530 and 540 are believed to be a better predictor of changes in vehicle speed than the measured acceleration 610.

In an example, the preliminary delta speed value 762 is subject to a tolerance range (e.g., ±10% of value 762) that includes an upper or positive tolerance 764 (e.g., +10%) and a lower or negative tolerance 766 (e.g., −10%). Tolerances 764 and 766 may have equal magnitudes and opposite signs, may have different magnitudes and opposite signs, or may have different magnitudes and equal signs. In an example, tolerances 764 and 766 may be vehicle-specific values fixedly selected by the manufacturer at the time of manufacture, or may be dynamically adjustable based on vehicle performance metrics, software or firmware updates, a Kalman filtering process, etc.

In an example, an addition step 770 adds the calibrated upper tolerance 764 (e.g., 0.1 times preliminary delta speed value 762) to the preliminary delta speed value 762, and outputs a delta vehicle speed upper limit 792 that represents the largest delta speed value that the system can accrue over the upcoming computing cycle of the speed estimation engine 142 (e.g., over the upcoming 2 milliseconds (ms), the upcoming 10 ms, etc.). Similarly, an addition step 780 adds the calibrated lower tolerance (e.g., −0.1 times the preliminary delta speed value 762) to the preliminary delta speed value 762, and outputs a delta vehicle speed lower limit 794 that represents the smallest delta speed value that the system can accrue over the upcoming computing cycle of the speed estimation engine 142.

It is understood that maps and weights 710, 720, 730, 752, and 754 may be adjusted dynamically based on numerous inputs, including but not limited to accelerator pedal position 540, brake pedal position 540, measured vehicle acceleration 610, road grade 360, previous vehicle speed, and wheel speeds 340. In an example, if both the brake pedal 520 and accelerator pedal 510 are depressed simultaneously, then the weight 752 of the pedal inputs may be reduced to reflect the resulting uncertainty in how the vehicle 105 will respond. In another example, if the difference between the largest wheel speed and the smallest wheel speed exceeds a threshold value, then it can be assumed that at least one wheel 115e is slipping. In this case, it may be desired to reduce the weight 752 of the pedal inputs and increase the weight 754 of accelerometer inputs. In other cases, certain weights may be set to small or zero values in the case of a detected or deduced malfunction in one or more vehicle subsystems, including but not limited to tire blowout, engine power failure, GPS communication failure, stuck pedal, pedal sensor failure, loss of brake fluid hydraulic pressure, loss of brake pad friction, wheel encoder failure, etc.

It is further understood that the calculations performed by the speed estimation engine 142, to yield upper and lower limits 792 and 794 for vehicle delta speed, may be performed in a different order than shown in FIG. 7. Additional steps can be provided before, during, and after the steps, and/or some of the steps described can be replaced or eliminated in other embodiments. One or more of the described steps or operations can be carried out by the speed estimation engine 142, or can be carried out by other engines, components or modules, or by subroutines running thereon, including but not limited to the VCU 110, brake ECU 112, drive train ECU or hybrid ECU 113, or one or more individual wheel controllers.

Figure 8:
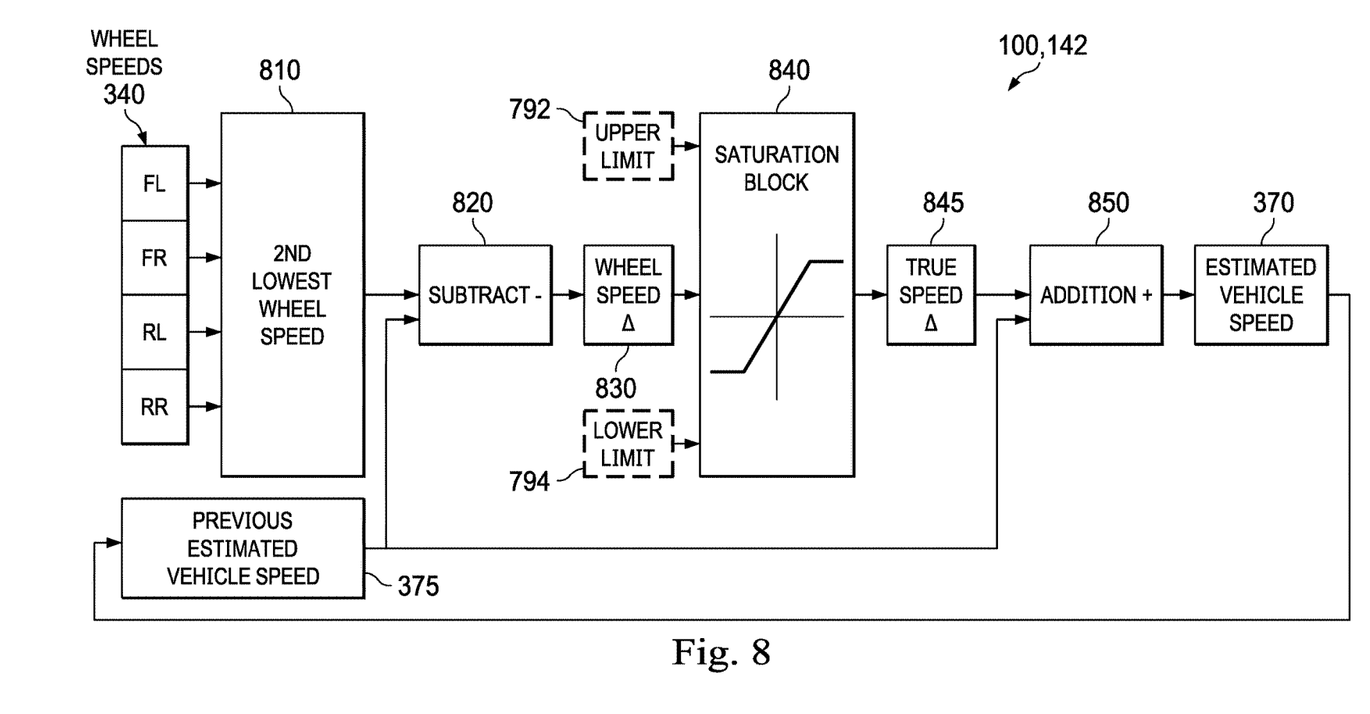
FIG. 8 is a diagrammatic illustration, in a block-diagram form, of at least a portion of an example vehicle speed estimation system in accordance with at least one embodiment of the present disclosure.

FIG. 8 is a diagrammatic illustration, in a block-diagram form, of at least a portion of an example vehicle speed estimation system 100 in accordance with at least one embodiment of the present disclosure. In an example, the current wheel speeds 340 (e.g., speeds in KPH, calculated for example as shown in FIG. 4) for each wheel 115e of the vehicle 105 are inputs to a selection step, which selects the second-lowest wheel speed 810. Next, a subtraction step 820 subtracts the previous value 375 of estimated vehicle speed from the second-lowest wheel speed 810, yielding a wheel speed delta 830. Next, a saturation block step 840 compares the wheel speed delta 830 against the speed delta upper limit 792 and speed delta lower limit 794 (calculated, for example, as shown in FIG. 7, although other calculations could be used to estimate these values). If the wheel speed delta 830 is larger than the speed delta upper limit 792, then the wheel speed delta 830 is deemed to be invalid (e.g., due to loss of traction), and the upper speed delta limit 792 is selected as the true delta speed 845. Similarly, if the wheel speed delta 830 is smaller than the speed delta lower limit 794, then the wheel speed delta 830 is deemed to be invalid, and the speed delta lower limit 794 is selected as the true speed delta 845. If the wheel speed delta 830 falls in between the speed delta upper limit 792 and the speed delta lower limit 794, then the wheel speed delta 830 is deemed to be valid (i.e., an accurate measurement of the change in vehicle speed over the next computation cycle of the speed estimation engine 142), and is selected as the true speed delta 845. This is effectively equivalent to selecting, as the true speed delta 845, the medium (or second-largest, or second-smallest) value from among the wheel speed delta 830, the speed delta upper limit 792, and the speed delta lower limit 794.

In an example, an addition step 850 adds the true speed delta 845 to the previous estimated vehicle speed 375, to yield the current estimated vehicle speed 370. As seen in FIGS. 3-8, the current estimated vehicle speed 370 takes into account numerous variables, including all four wheel speeds 340, accelerator pedal position 235, brake pedal position 240, measured vehicle acceleration 350, and estimated road grade 360. Accordingly, when compared to speed estimation systems that take into account only the second-lowest wheel speed, the speed estimation system 100 provides a measurement or estimate of current vehicle speed, that is more robust and more accurate under conditions of wheel slip. The speed estimation engine 142 may operate for example on a calculation cycle of between 2 ms and 10 ms (i.e., a rate of between 100 Hz and 500 Hz), although other values both larger and smaller may be used instead or in addition. In some embodiments, some portions of the speed estimation engine 142 operate at different speeds from other portions of the speed estimation engine 142. For example, estimated road grade may update relatively slowly (e.g., once per second), whereas wheel encoders may update at least every 2 milliseconds.

It is understood that the calculations performed by the speed estimation engine 142, to yield the true speed delta 845 may be performed in a different order than shown in FIG. 8. Additional steps can be provided before, during, and after the steps, and/or some of the steps described can be replaced or eliminated in other embodiments. One or more of the described steps or operations can be carried out by the speed estimation engine 142, or can be carried out by other engines, components or modules, or by subroutines running thereon, including but not limited to the VCU 110, brake ECU 112, drive train ECU or hybrid ECU 113, or one or more individual wheel controllers. In some embodiments, the calculations are based directly on speeds rather than on speed deltas over a period of time. Therefore, unless specifically stated otherwise, a reference to a speed in the claims may be considered to comprise either an absolute speed at a particular time, or a change in speed over a defined period of time.

Figure 9:
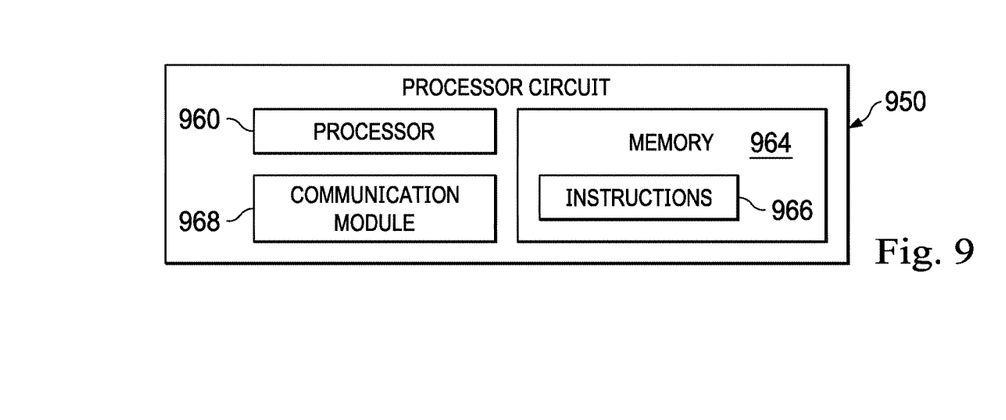
FIG. 9 is a diagrammatic illustration, in a block-diagram form, of a processor circuit, according to embodiments of the present disclosure.

FIG. 9 is a schematic diagram of a processor circuit 950, according to embodiments of the present disclosure. The processor circuit 950 may be implemented in the speed estimation engine 142 or VCU 110 of FIGS. 1 and 2, the portable device 300 of FIGS. 2, 3, and 4, or other devices or workstations (e.g., third-party workstations, network routers, etc.), or on a cloud processor or other remote processing unit, as necessary to implement the method. As shown, the processor circuit 950 may include a processor 960, a memory 964, and a communication module 968. These elements may be in direct or indirect communication with each other, for example via one or more buses.

The processor 960 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 960 may also comprise another hardware device, a firmware device, or any combination thereof configured to perform the operations described herein. The processor 960 may also be implemented as a combination of computing devices, e.g., a combination of a DSP and a microprocessor, a plurality of microprocessors, one or more microprocessors in conjunction with a DSP core, or any other such configuration.

The memory 964 may include a cache memory (e.g., a cache memory of the processor 960), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 964 includes a non-transitory computer-readable medium. The memory 964 may store instructions 966. The instructions 966 may include instructions that, when executed by the processor 960, cause the processor 960 to perform the operations described herein. Instructions 966 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 968 can include any electronic circuitry and/or logic circuitry to facilitate direct or indirect communication of data between the processor circuit 950, and other processors or devices. In that regard, the communication module 968 can be an input/output (I/O) device. In some instances, the communication module 968 facilitates direct or indirect communication between various elements of the processor circuit 950 and/or the vehicle speed estimation system 100. The communication module 968 may communicate within the processor circuit 950 through numerous methods or protocols. Serial communication protocols may include but are not limited to US SPI, I$^2$C, RS-232, RS-485, CAN, Ethernet, ARINC 429, MOD-BUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the ultrasound device) may be accomplished using any suitable wireless or wired communication technology, e.g., a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the vehicle speed estimation system advantageously provides a measurement or estimate of current vehicle speed that takes into account numerous variables, including wheel speeds, pedal positions, accelerometer data, geographic data, and previous values for speed. Accordingly, when compared to speed estimation systems that take into account only the second-lowest wheel speed, the speed estimation system 100 is more robust and more accurate under conditions of wheel slip, thus reducing the risk of control loss or mechanical damage resulting from a wheel overspeed condition. Depending on the implementation, a number of variations are possible on the examples and embodiments described above. For example, the technology may be applied to different vehicle types, including on-road and off-road vehicles, three-wheeled vehicles, and multi-wheeled vehicles, and may be applied to the wheels of aircraft during taxi and takeoff. Other variables and other logical or arithmetic operations may be employed than those described above, in order to derive upper and lower limits on wheel speed delta that can be compared against the wheel speed deltas. Other wheel speeds than the second-lowest wheel speed may be used to compute the wheel speed delta. For example, the fastest, second-fastest, or slowest wheel speed may be used.

The logical operations making up the embodiments of the technology described herein are referred to variously as operations, steps, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the vehicle speed estimation system or its components. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide an enabling description of the structure and use of exemplary embodiments of the vehicle speed estimation system as defined in the claims. Although various embodiments of the claimed subject matter have been described above with a certain degree of particularity, or with reference to one or more individual embodiments, those skilled in the art would understand that numerous alterations to the disclosed embodiments are contemplated without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system for estimating a speed of a vehicle, comprising:
   a plurality of wheel rotation sensors, each configured to provide rotation speed information of a corresponding wheel of the vehicle;
   a grade sensor configured to provide grade information of a ground surface beneath the vehicle;
   an acceleration sensor configured to provide acceleration information of the vehicle;
   a first pedal deflection sensor configured to provide a first pedal deflection information of an accelerator pedal of the vehicle;
   a second pedal deflection sensor configured to provide a second pedal deflection information of a brake pedal of the vehicle;
   a processor configured to:
      compute a linear wheel speed based on the rotation speed information of the wheels of the vehicle;
      compute an upper limit of vehicle speed and a lower limit of vehicle speed, based on the grade information, the first pedal deflection information, the second pedal deflection information, and the acceleration information; and
      compute an estimated speed of the vehicle based on the linear wheel speed, the upper limit of vehicle speed, and the lower limit of vehicle speed.

2. The system of claim 1, wherein each of the plurality of wheel rotation sensors comprises a wheel encoder.

3. The system of claim 1, wherein computing the linear wheel speed involves:
   selecting a second-smallest wheel rotation speed of the rotation speed information of the wheels of the vehicle; and
   converting the second-smallest wheel rotation speed to a linear speed based on a circumference of a wheel of the vehicle corresponding to the second-smallest wheel rotation speed.

4. The system of claim 1, wherein the grade sensor comprises the acceleration sensor.

5. The system of claim 1, wherein the grade sensor comprises a positioning sensor and a geographic database.

6. The system of claim 1, wherein computing the upper limit of vehicle speed and the lower limit of vehicle speed includes:
   selecting the first pedal deflection as a pedal input if the first pedal deflection is nonzero, and otherwise selecting the second pedal deflection as the pedal input;
   computing an expected speed change based on the pedal input and the grade information;
   computing a preliminary speed change estimate by adding the expected speed change weighted by a first weight to the acceleration information of the vehicle weighted by a second weight;
   computing the upper limit of vehicle speed based on the preliminary speed change estimate and an upper tolerance; and computing the lower limit of vehicle speed based on the preliminary speed change estimate and a lower tolerance.

7. The system of claim 1, wherein computing the estimated speed of the vehicle includes selecting a second-largest value from the group comprising: the lower limit of vehicle speed, the linear wheel speed, and the upper limit of vehicle speed.

8. The system of claim 1, wherein the processor is configured to calculate the estimated speed of the vehicle continuously in a cycle time of between 2 milliseconds and 10 milliseconds.

9. The system of claim 1, further comprising the vehicle.

10. A method for estimating a speed of a vehicle, the method comprising:
   measuring rotation speeds of at least one wheel of the vehicle;
   based on the rotation speeds of the at least one wheel of the vehicle, computing a linear wheel speed;
   obtaining grade information for a ground surface beneath the vehicle;
   measuring a first pedal deflection of an accelerator pedal of the vehicle;
   measuring a second pedal deflection of a brake pedal of the vehicle;
   measuring an acceleration of the vehicle;
   based on the grade information, the first pedal deflection, the second pedal deflection, and the acceleration of the vehicle, computing an upper limit of vehicle speed and a lower limit of vehicle speed; and
   selecting a speed estimate based on a second-largest value from the group comprising: the linear wheel speed, the upper limit of vehicle speed, and the lower limit of vehicle speed.

11. The method of claim 10, wherein computing the linear wheel speed involves:
   selecting a second-smallest wheel rotation speed of the rotation speeds of the at least one wheel of the vehicle; and
   converting the second-smallest wheel rotation speed to a linear speed based on a circumference of a wheel of the vehicle corresponding to the second-smallest rotation speed.

12. The method of claim 10, wherein obtaining the grade information comprises reading at least one value from an acceleration sensor.

13. The method of claim 10, wherein obtaining the grade information involves reading values from a positioning sensor and a geographic database.

14. The method of claim 10, wherein computing the upper limit of vehicle speed and the lower limit of vehicle speed includes:
   selecting the first pedal deflection as a pedal input if the first pedal deflection is nonzero, and otherwise selecting the second pedal deflection as the pedal input;
   computing an expected speed change based on the pedal input and the grade information;
   computing a preliminary speed change estimate by adding the expected speed change weighted by a first weight to the vehicle acceleration weighted by a second weight;
   computing the upper limit of vehicle speed based on the preliminary speed change estimate and an upper tolerance; and
   computing the lower limit of vehicle speed based on the preliminary speed change estimate and a lower tolerance.

15. A method for estimating a speed of a vehicle, the method comprising:
   measuring rotation speeds of at least one wheel of the vehicle;
   based on the rotation speeds of the at least one wheel of the vehicle, computing a change in a linear wheel speed over a defined period of time;
   obtaining grade information for a ground surface beneath the vehicle;
   measuring a first pedal deflection of an accelerator pedal of the vehicle;
   measuring a second pedal deflection of a brake pedal of the vehicle;
   measuring an acceleration of the vehicle;
   based on the grade information, the first pedal deflection, the second pedal deflection, and the acceleration of the vehicle, computing an upper limit of a change in vehicle speed over the defined period of time and a lower limit of the change in vehicle speed over the defined period of time; and
   selecting a speed estimate equal to a previous speed of the vehicle plus a second-largest value from among the group comprising: the change in the linear wheel speed over the defined period of time, the upper limit of the change in vehicle speed over the defined period of time, and the lower limit of the change in vehicle speed over the defined period of time.

16. The method of claim 15, wherein computing the linear wheel speed involves:
   selecting a second-smallest wheel rotation speed of the rotation speeds of the at least one wheel of the vehicle; and
   converting the second-smallest wheel rotation speed to a linear speed based on a circumference of a wheel of the vehicle corresponding to the second-smallest rotation speed.

17. The method of claim 15, wherein obtaining the grade information comprises reading at least one value from an acceleration sensor.

18. The method of claim 15, wherein obtaining the grade information involves reading values from a positioning sensor and a geographic database.

19. The method of claim 15, wherein computing the upper limit of the change in vehicle speed and the lower limit of the change in vehicle speed includes:
   selecting the first pedal deflection as a pedal input if the first pedal deflection is nonzero, and otherwise selecting the second pedal deflection as the pedal input;
   computing an expected speed change based on the pedal input and the grade information;
   computing a preliminary speed change estimate by adding the expected speed change weighted by a first weight to the vehicle acceleration weighted by a second weight;
   computing the upper limit of vehicle speed change based on the preliminary speed change estimate and an upper tolerance; and
   computing the lower limit of vehicle speed change based on the preliminary speed change estimate and a lower tolerance.

* * * * *